C. A. BODDIE.
MAXIMUM DEMAND METER.
APPLICATION FILED APR. 4, 1916.

1,303,457.

Patented May 13, 1919.

WITNESSES:
R. J. Fitzgerald.
J. H. Procter

INVENTOR
Clarence A. Boddie.
BY
Wesley G. Carr
ATTORNEY

UNITED STATES PATENT OFFICE.

CLARENCE A. BODDIE, OF PITTSBURGH, PENNSYLVANIA, ASSIGNOR TO WESTINGHOUSE ELECTRIC AND MANUFACTURING COMPANY, A CORPORATION OF PENNSYLVANIA.

MAXIMUM-DEMAND METER.

1,303,457.   Specification of Letters Patent.   Patented May 13, 1919.

Application filed April 4, 1916. Serial No. 88,975.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Maximum-Demand Meters, of which the following is a specification.

My invention relates to measuring instruments and particularly to indicating maximum-demand meters.

The object of my invention is to provide a meter of the above indicated character that shall have an escapement device for retarding its time of operation in accordance with the resultant torque exerted by its movable member.

My copending U. S. application Serial No. 687,395, filed March 30, 1912, now Patent 1,206,772, Nov. 28, 1916, discloses an indicating maximum-demand meter the time of operation of which is controlled by a wattmeter mechanism that receives its turning moment from the same means that actuates the movable member of the maximum-demand meter.

My present invention comprises a single indicating wattmeter and a relatively simple and inexpensive escapement device that is adapted to retard the movement of the movable member of the wattmeter an interval of time that varies in accordance with the resultant torque of the movable member.

Figure 1:
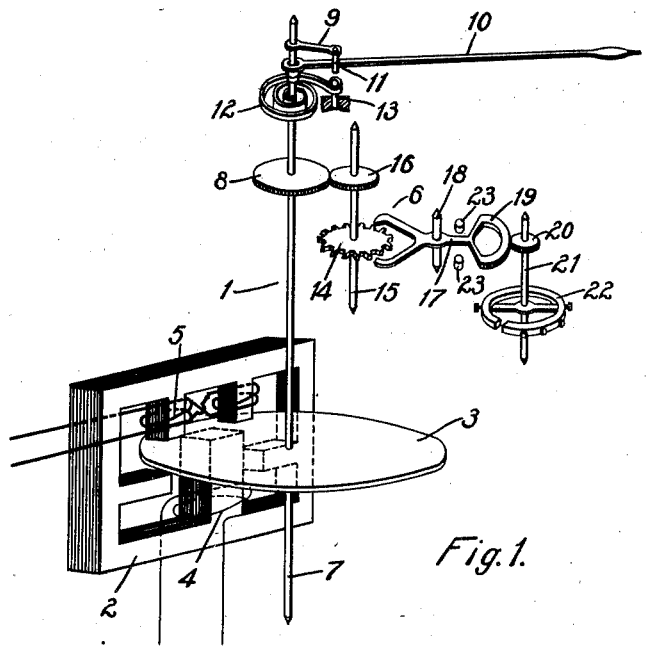
Figure 2:
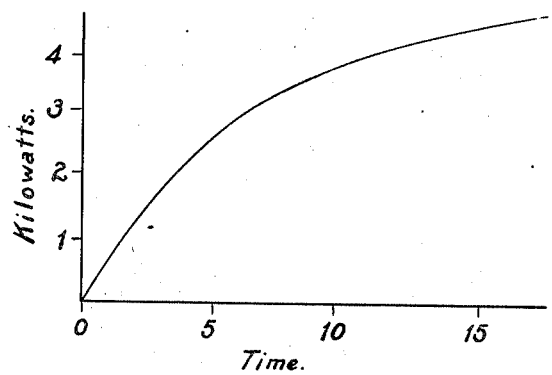

Figure 1 of the accompanying drawing is a diagrammatic view of a maximum-demand meter embodying my invention, and Fig. 2 is a diagram illustrating the performance of a meter embodying my invention.

An indicating maximum-demand meter 1 comprises a stationary magnetizable core member 2, an armature 3, a potential winding 4, a current winding 5 and an escapement device 6. The winding 4 surrounds one portion of the magnetizable core member 2 and the winding 5 surrounds other portions of the magnetizable core member 2. The armature 3 is mounted on a shaft 7 upon which a gear wheel 8 and an arm 9 are also mounted. A pointer 10 is loosely mounted upon the shaft 7 and is adapted to be moved in one direction only by a projection 11 on the arm 9. A spring 12 is connected, at its inner end, to the shaft 7 and, at its outer end, to a stationary member 13.

The escapement device 6 comprises an escapement wheel 14 that is mounted on a shaft 15 upon which a pinion 16 is also mounted. The pinion 16 is adapted to engage the gear wheel 8 for the purpose of transmitting a turning moment to the escapement wheel 14 that is proportional to the resultant torque of the armature 3. A double pallet 17 is pivoted on a shaft 18 and is provided with a segmental or mutilated gear wheel 19 that is adapted to engage a pinion 20 which is mounted on a shaft 21 upon which an unrestrained balance wheel 22 is also mounted. Stationary members 23 are provided for limiting the movement of the double pallet 17.

If the escapement device 6 were not provided and the windings 4 and 5 were energized, the armature 3 would turn against the action of the spring 12 to thereby move the pointer 10 to indicate the energy traversing the windings 4 and 5. However, it is advisable in maximum-demand meters to indicate a value of steady load that may be regarded as the demand equivalent of the fluctuating load. If some means were provided for prolonging the time required for the pointer 10 to indicate a steady value, the indication of the pointer 10 might be assumed to be a measure of a steady load that is the demand equivalent of a fluctuating load. The escapement device 6 is so constructed that it will permit the escapement wheel to be advanced in accordance with the applied force, or, in other words, in accordance with the resultant torque of the armature 3. That is to say, the time required for the pointer 10 to indicate a steady value will vary in accordance with the curve shown in Fig. 2. For instance, it will take substantially fifteen minutes for the pointer 10 to indicate four kilowatts if that amount of energy traverses its windings for that length of time.

It will be understood that the balance wheel 22 is not provided with a hair spring, as is the case in ordinary escapement devices, and, consequently, it does not control the release of the escapement wheel 14 constantly but in accordance with the turning moment of the shaft 3.

The pointer 10 is adapted to remain in the position to which it is moved to indicate the highest maximum-demand that persists for a predetermined interval of time. The time interval may be controlled by limiting the movement of the double pallet 17 or by changing the mass of the balance wheel 22.

I do not limit my invention to the particular structure illustrated, as many modifications may be made therein without departing from the spirit and scope of the appended claims.

I claim as my invention:

1. In a maximum-demand meter, the combination with an indicating wattmeter, of an escapement device for causing the time of operation of the wattmeter to vary in accordance with its torque.

2. In a maximum-demand meter, the combination with an indicating wattmeter, of an escapement wheel operatively connected to the movable member of the wattmeter, a double pallet for the escapement wheel and an unrestrained balance wheel for the double pallet.

3. A maximum-demand meter comprising a movable member, a spring for restraining the movable member, a freely movable pointer adapted to be moved in one direction only by the movable member, and an escapement device having a freely movable balance wheel for retarding the movement of the movable member.

4. A maximum-demand meter comprising a movable member, a spring for restraining the movable member, a freely movable pointer adapted to be moved in one direction only by the movable member, and an escapement device having a non-restrained balance wheel for retarding the indication of the pointer an interval of time in accordance with the torque of the movable member.

5. The combination with an indicating wattmeter, of an escapement device having a non-restrained balance wheel for prolonging the interval of time required for the meter to indicate the energy traversing its windings, said escapement device being adapted to operate in accordance with the torque of the movable member of the meter.

6. The combination with an indicating meter, of an escapement device having a non-restrained balance wheel for causing the time of operation of the meter to vary in accordance with its torque.

7. In a wattmeter, the combination with a spring-restrained movable member, of an escapement device having a non-restrained member for causing the time of operation of the spring-restrained movable member to vary in accordance with its resultant torque.

8. In an electro-responsive device, the combination with a movable member, of an escapement device therefor having a non-restrained balance wheel for causing the speed of the movable member to vary in accordance with its torque.

9. In an electro-responsive device, the combination with a movable member, of an escapement device having a non-restrained balance wheel for causing the time of operation of the movable member to vary in accordance with its torque.

10. In a maximum-demand meter, the combination with a movable member, of an escapement wheel associated therewith, a double pallet for the escapement wheel, and an unrestrained balance wheel for the double pallet.

11. The combination with an indicating wattmeter, of an escapement device therefor having a non-restrained balance wheel for so controlling the operation of the wattmeter that it indicates a value of steady load corresponding to the demand equivalent of a fluctuating load.

12. The combination with an indicating wattmeter, of an escapement device therefor having a freely movable balance wheel, said escapement device being adapted to so lag the indications of the wattmeter that it indicates the demand equivalent of the fluctuating energy traversing the same.

13. The combination with an indicating wattmeter, of an escapement device for prolonging the interval of time required for the meter to indicate the energy traversing its windings, said escapement device being adapted to operate in accordance with the energy being measured.

14. The combination with an indicating wattmeter, of an escapement device for prolonging the interval of time required for the meter to indicate the energy traversing its windings, said escapement device being adapted to operate in accordance with the torque of the movable member of the meter.

In testimony whereof, I have hereunto subscribed my name this 27th day of March 1916.

CLARENCE A. BODDIE.